(12) United States Patent
Nielsen

(10) Patent No.: US 9,332,080 B1
(45) Date of Patent: May 3, 2016

(54) SYSTEMS AND METHODS FOR INDICATING A USER STATE IN A SOCIAL NETWORK

(75) Inventor: Thomas Alan Nielsen, Newark, CA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/198,555

(22) Filed: Aug. 4, 2011

Related U.S. Application Data

(63) Continuation of application No. 10/861,031, filed on Jun. 4, 2004, now Pat. No. 8,019,875.

(51) Int. Cl.
  *G06F 15/16* (2006.01)
  *H04L 29/08* (2006.01)

(52) U.S. Cl.
  CPC .............. *H04L 67/22* (2013.01); *H04L 67/306* (2013.01)

(58) Field of Classification Search
  CPC ............................ H04L 67/22; H04L 67/306
  USPC ........................................................ 709/204
  See application file for complete search history.

(56) References Cited

U.S. PATENT DOCUMENTS

| | | | |
|---|---|---|---|
| 5,287,498 A | 2/1994 | Perelman et al. | |
| 5,537,586 A | 7/1996 | Amram et al. | |
| 5,796,393 A | 8/1998 | MacNaughton et al. | |
| 5,950,200 A | 9/1999 | Sudai et al. | |
| 5,963,951 A | 10/1999 | Collins | |
| 6,041,311 A | 3/2000 | Chislenko et al. | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,092,049 A | 7/2000 | Chislenko et al. | |
| 6,130,938 A | 10/2000 | Erb | |
| 6,192,119 B1 | 2/2001 | Wilson | |
| 6,256,648 B1 | 7/2001 | Hill et al. | |
| 6,285,999 B1 | 9/2001 | Page | |
| 6,327,590 B1 | 12/2001 | Chidlovskii | |
| 6,366,962 B1 | 4/2002 | Teibel | |
| 6,389,372 B1 | 5/2002 | Glance et al. | |
| 6,421,678 B2 | 7/2002 | Smiga et al. | |

(Continued)

FOREIGN PATENT DOCUMENTS

| | | |
|---|---|---|
| CN | 1949220 A | 4/2007 |
| JP | 11265369 A | 9/1999 |

(Continued)

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Wing F Chan
*Assistant Examiner* — Andrew Woo
(74) *Attorney, Agent, or Firm* — Patent Law Works LLP

(57) ABSTRACT

Methods and Systems for determining a user state for a member of a social network are described. According to one embodiment, a method comprising receiving in a network of associated users user state information for a first user, wherein the network of associated users comprises user established relationships between users, determining a current user state for the first user; and outputting to a second user the user state information based at least in part on the current user state and a relationship based permission status is set forth.

20 Claims, 3 Drawing Sheets

(56) References Cited

U.S. PATENT DOCUMENTS

| | | |
|---|---|---|
| 6,442,567 B1 | 8/2002 | Retallick et al. |
| 6,594,673 B1 | 7/2003 | Smith et al. |
| 6,658,095 B1 | 12/2003 | Yoakum et al. |
| 6,658,423 B1 | 12/2003 | Pugh et al. |
| 6,665,715 B1 | 12/2003 | Houri |
| 6,678,681 B1 | 1/2004 | Brin |
| 6,697,478 B1 | 2/2004 | Meldrum et al. |
| 6,754,322 B1 | 6/2004 | Bushnell |
| 6,782,425 B1 | 8/2004 | Germscheid |
| 6,799,176 B1 | 9/2004 | Page |
| 6,834,195 B2 | 12/2004 | Brandenberg et al. |
| 6,837,436 B2 | 1/2005 | Swartz et al. |
| 6,865,546 B1 | 3/2005 | Song |
| 6,871,186 B1 | 3/2005 | Tuzhilin et al. |
| 6,895,406 B2 | 5/2005 | Fables et al. |
| 6,912,505 B2 | 6/2005 | Linden et al. |
| 6,912,564 B1 | 6/2005 | Appelman et al. |
| 6,917,621 B1 | 7/2005 | Silver |
| 6,968,179 B1 * | 11/2005 | De Vries .................... 455/414.1 |
| 7,013,292 B1 | 3/2006 | Hsu et al. |
| 7,016,978 B2 | 3/2006 | Malik et al. |
| 7,035,923 B1 * | 4/2006 | Yoakum .................. H04L 67/24 |
| | | 379/106.01 |
| 7,069,308 B2 * | 6/2006 | Abrams ................. G06Q 10/10 |
| | | 705/319 |
| 7,080,117 B2 | 7/2006 | De Pinto et al. |
| 7,092,821 B2 | 8/2006 | Mizrahi et al. |
| 7,100,116 B1 | 8/2006 | Shafrir et al. |
| 7,106,848 B1 | 9/2006 | Barlow et al. |
| 7,110,983 B2 | 9/2006 | Shear |
| 7,113,917 B2 | 9/2006 | Jacobi et al. |
| 7,117,254 B2 | 10/2006 | Lunt et al. |
| 7,117,445 B2 | 10/2006 | Berger |
| 7,130,777 B2 | 10/2006 | Garg |
| 7,130,844 B2 | 10/2006 | Elder et al. |
| 7,139,252 B2 | 11/2006 | Babu et al. |
| 7,139,797 B1 | 11/2006 | Yoakum et al. |
| 7,177,904 B1 | 2/2007 | Mathur et al. |
| 7,188,153 B2 | 3/2007 | Lunt et al. |
| 7,225,249 B1 | 5/2007 | Barry |
| 7,227,937 B1 | 6/2007 | Yoakum et al. |
| 7,233,933 B2 | 6/2007 | Horvitz et al. |
| 7,234,117 B2 | 6/2007 | Zaner |
| 7,240,298 B2 | 7/2007 | Grossman et al. |
| 7,246,164 B2 | 7/2007 | Lehmann |
| 7,269,590 B2 | 9/2007 | Hull |
| 7,272,634 B2 | 9/2007 | Clement et al. |
| 7,275,068 B2 | 9/2007 | Huberman et al. |
| 7,343,335 B1 | 3/2008 | Olliphant |
| 7,356,490 B1 | 4/2008 | Jacobi et al. |
| 7,360,080 B2 | 4/2008 | Camnisch et al. |
| 7,366,990 B2 | 4/2008 | Pitroda |
| 7,373,428 B1 | 5/2008 | Armstrong et al. |
| 7,383,258 B2 | 6/2008 | Harik |
| 7,395,329 B1 | 7/2008 | Holt et al. |
| 7,433,832 B1 | 10/2008 | Bezos et al. |
| 7,433,876 B2 | 10/2008 | Spivack et al. |
| 7,457,628 B2 | 11/2008 | Blumberg et al. |
| 7,478,078 B2 | 1/2009 | Lunt |
| 7,499,974 B2 | 3/2009 | Karstens |
| 7,539,697 B1 | 5/2009 | Akella et al. |
| 7,555,110 B2 | 6/2009 | Dolan et al. |
| 7,610,287 B1 | 10/2009 | Dean et al. |
| 7,631,047 B1 | 12/2009 | Adamczyk et al. |
| 7,644,144 B1 | 1/2010 | Horvitz et al. |
| 7,739,210 B2 | 6/2010 | Horvitz et al. |
| 7,742,468 B2 | 6/2010 | Vagelos |
| 7,747,719 B1 | 6/2010 | Horvitz et al. |
| 7,747,761 B2 | 6/2010 | Wengrovitz |
| 7,752,268 B2 | 7/2010 | Shah |
| 7,788,333 B2 | 8/2010 | Adamczyk et al. |
| 7,870,240 B1 | 1/2011 | Horvitz |
| 7,979,802 B1 | 7/2011 | Appelman |
| 8,037,141 B2 | 10/2011 | Daniell |
| 8,161,165 B2 | 4/2012 | Horvitz |
| 8,166,178 B2 | 4/2012 | Horvitz |
| 8,249,060 B1 | 8/2012 | Horvitz |
| 8,271,631 B1 | 9/2012 | Horvitz et al. |
| 8,402,148 B2 | 3/2013 | Horvitz |
| 8,489,516 B1 | 7/2013 | Nielsen et al. |
| 2001/0011247 A1 | 8/2001 | O'Flaherty |
| 2002/0023230 A1 | 2/2002 | Bolnick |
| 2002/0035605 A1 | 3/2002 | McDowell et al. |
| 2002/0059130 A1 | 5/2002 | Cheng et al. |
| 2002/0059201 A1 | 5/2002 | Work |
| 2002/0095465 A1 | 7/2002 | Banks et al. |
| 2002/0103682 A1 | 8/2002 | Stemmer |
| 2002/0116458 A1 | 8/2002 | Bricklin |
| 2002/0116466 A1 | 8/2002 | Trevithick et al. |
| 2002/0124053 A1 | 9/2002 | Adams et al. |
| 2002/0137490 A1 | 9/2002 | Gallant |
| 2002/0143874 A1 | 10/2002 | Marquette et al. |
| 2002/0143944 A1 | 10/2002 | Traversat |
| 2002/0147790 A1 | 10/2002 | Snow |
| 2002/0161862 A1 | 10/2002 | Horvitz |
| 2002/0169782 A1 | 11/2002 | Lehmann et al. |
| 2002/0169835 A1 | 11/2002 | Paul |
| 2002/0174073 A1 | 11/2002 | Nordman et al. |
| 2002/0174199 A1 | 11/2002 | Horvitz |
| 2003/0020977 A1 | 1/2003 | Smith et al. |
| 2003/0050977 A1 * | 3/2003 | Puthenkulam et al. ....... 709/204 |
| 2003/0083898 A1 | 5/2003 | Wick |
| 2003/0101227 A1 | 5/2003 | Fink |
| 2003/0154213 A1 | 8/2003 | Ahn |
| 2003/0163530 A1 | 8/2003 | Ribak |
| 2003/0217151 A1 | 11/2003 | Roese et al. |
| 2003/0233650 A1 | 12/2003 | Zaner et al. |
| 2004/0003042 A1 | 1/2004 | Horvitz et al. |
| 2004/0042599 A1 | 3/2004 | Zaner et al. |
| 2004/0054737 A1 | 3/2004 | Daniell |
| 2004/0059781 A1 | 3/2004 | Yoakum et al. |
| 2004/0064514 A1 | 4/2004 | Daniell et al. |
| 2004/0088325 A1 | 5/2004 | Elder et al. |
| 2004/0093224 A1 | 5/2004 | Vanska |
| 2004/0122681 A1 | 6/2004 | Ruvolo et al. |
| 2004/0122803 A1 | 6/2004 | Dom et al. |
| 2004/0122810 A1 | 6/2004 | Mayer |
| 2004/0162830 A1 | 8/2004 | Shirwadkar et al. |
| 2004/0167794 A1 | 8/2004 | Shostack |
| 2004/0172378 A1 | 9/2004 | Shanahan et al. |
| 2004/0193684 A1 | 9/2004 | Ben Yoseph |
| 2004/0215793 A1 | 10/2004 | Ryan et al. |
| 2004/0221309 A1 | 11/2004 | Zaner |
| 2004/0249811 A1 | 12/2004 | Shostack et al. |
| 2004/0258220 A1 | 12/2004 | Levine et al. |
| 2004/0260781 A1 | 12/2004 | Shostack et al. |
| 2005/0001743 A1 | 1/2005 | Haemerle |
| 2005/0015432 A1 | 1/2005 | Cohen |
| 2005/0015457 A1 | 1/2005 | Warasawa |
| 2005/0044144 A1 | 2/2005 | Malik et al. |
| 2005/0050158 A1 | 3/2005 | Solari |
| 2005/0071741 A1 | 3/2005 | Acharya et al. |
| 2005/0091272 A1 | 4/2005 | Smith et al. |
| 2005/0120084 A1 | 6/2005 | Hu et al. |
| 2005/0152521 A1 | 7/2005 | Liljestrand |
| 2005/0154793 A1 | 7/2005 | Khartabil |
| 2005/0159998 A1 | 7/2005 | Buyukkokten et al. |
| 2005/0165785 A1 | 7/2005 | Malkin et al. |
| 2005/0165880 A1 * | 7/2005 | Moody .................. G06Q 10/10 |
| | | 709/200 |
| 2005/0171832 A1 | 8/2005 | Hull et al. |
| 2005/0171954 A1 | 8/2005 | Hull et al. |
| 2005/0177599 A1 | 8/2005 | Goodman |
| 2005/0193054 A1 | 9/2005 | Wilson et al. |
| 2005/0193102 A1 | 9/2005 | Horvitz |
| 2005/0197846 A1 | 9/2005 | Pezaris et al. |
| 2005/0198031 A1 | 9/2005 | Pezaris et al. |
| 2005/0209999 A1 | 9/2005 | Jou |
| 2005/0210409 A1 | 9/2005 | Jou |
| 2005/0216300 A1 | 9/2005 | Appelman et al. |
| 2005/0216550 A1 | 9/2005 | Paseman et al. |
| 2005/0246420 A1 | 11/2005 | Little |
| 2005/0256756 A1 | 11/2005 | Lam et al. |
| 2005/0256866 A1 | 11/2005 | Lu et al. |

(56) References Cited

U.S. PATENT DOCUMENTS

| | | |
|---|---|---|
| 2005/0267766 A1 | 12/2005 | Galbreath et al. |
| 2006/0026288 A1 | 2/2006 | Acharya et al. |
| 2006/0077957 A1 | 4/2006 | Reddy et al. |
| 2006/0085259 A1 | 4/2006 | Nicholas |
| 2006/0136419 A1 | 6/2006 | Brydon et al. |
| 2006/0184997 A1 | 8/2006 | La Rotonda et al. |
| 2006/0206604 A1 | 9/2006 | O'Neil et al. |
| 2007/0071209 A1 | 3/2007 | Horvitz |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0248077 A1 | 10/2007 | Mahle, Jr. et al. |
| 2008/0056475 A1 | 3/2008 | Brannick et al. |
| 2008/0104517 A1 | 5/2008 | Horvitz |
| 2008/0133716 A1 | 6/2008 | Rao et al. |
| 2008/0134069 A1 | 6/2008 | Horvitz |
| 2008/0140776 A1 | 6/2008 | Horvitz |
| 2008/0192656 A1 | 8/2008 | Vagelos |
| 2009/0013386 A1 | 1/2009 | Puthenkulam et al. |
| 2010/0070874 A1 | 3/2010 | Adamczyk et al. |
| 2011/0098156 A1 | 4/2011 | Ng et al. |

FOREIGN PATENT DOCUMENTS

| | | |
|---|---|---|
| JP | 02132604 A | 5/2002 |
| WO | WO 01/84266 | 11/2001 |
| WO | WO 02/79984 | 10/2002 |
| WO | WO 00/68860 A3 | 7/2003 |
| WO | WO 2005/015470 A1 | 2/2005 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Amazon.com, "Feedback FAQ," 3 pgs, [online] [Retrieved on Jul. 29, 2004] Retrieved from the internet <URL:http://pages.amazon.com/execlobidos/tg/browse/-/1161284/qid=1091110289/sr=1-1/002-2>.

Amazon.com, "How to Get a Great Feedback Score," 3 pgs, [online] [Retrieved on Jul. 29, 2004] Retrieved from the internet <URL:http://pages.amazon.com/execlobidos/tg/browse/-/13107471/qid=1091110289/sr=1-5/002>.

Amazon.com, "New Seller FAQ," 3 pgs, [online] [Retrieved on Jul. 29, 2004] Retrieved from the internet <URL:http://pages.amazon.com/execlobidos/tg/browse/-/1161274/002-2835726-5513622>.

Amazon.com, "Selling at Amazon Marketplace," 2 pgs, [online] [Retrieved on Jul. 29, 2004] Retrieved from the internet <URL:http://pages.amazon.com/execlobidos/tg/browse/-/1161234/ref=hp_hp_ls_4_2/002-283572>.

Amazon.com, "Amazon.com Friends and Favorites," 6 pgs, [online] [Retrieved on Feb. 27, 2004] Retrieved from the internet <URL:http://www.amazon.com/exec/obidos/subst/community/community-home.html/ref=pd_ys_. . . >.

Amazon.com. "Purchase Circles," 2 pgs, [online] [Retrieved on Feb. 27, 2004] Retrieved from the internet <URL: http://www.amazon.com/exec/obidos/tg/browse/468604/ref=cm_pc_faq/002-0759267-82 . . . >.

Amazon.com, "Wish Lists," 4 pgs, [online] [Retrieved on Feb. 18, 2004] Retrieved from the internet <URL:http:// www.amazon.com/exec/obidos/tg/browse/-/897204/ref=ya_hp_reg_1/002-9880811-. . . >.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Avery, C., et al., "Recommender Systems for Evaluating Computer Messages," Communications of the ACM, Mar. 1997, pp. 88-89, vol. 40, No. 3.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Balabanovic, M., et al., "Content-Based, Collaborative Recommendation," Mar. 1997, pp. 66-72, vol. 40, No. 3.

Boyd, et al., "Social Network Sites: Definition, History, and Scholarship," Journal of Computer-Mediated Communication, International Communication Association, 2008, pp. 210-230.

Choi, J., "Netflix Prize for the best collaborative filtering algorithm," Data mining and parallelization, CGL Blog, Jul. 16, 2008, [online] [Retrieved on May 13, 2009] Retrieved from the internet <URL: http://jychoi-report-cgl.blogspot.com/2008/07/netflix-prize-for-best-collaborative.html>.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

"Collaborative filtering," Wikipedia, Last modified Oct. 17, 2007, [online] [Retrieved on May 13, 2009] Retrieved from the internet <URL:http://web.archive.org/web/20071020061658/http://en.wikipedia.org/wiki/Collaborative_filtering>.

Decker et al., "The Social Semantic Desktop," Digital Enterprise Research Institute, DERI Galway, Ireland, DERI Innsbruck, Austria, DERI Technical Report, May 2, 2004, 7 pgs.

Doctorow, copy, "Running Notes From Revenge of the User: Lessons from Creator/User Battles," web page at http://craphound.com/danahetcon04.txt, as available via the Internet and printed Jul. 28, 2004.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Ebay.com, "Frequently Asked Questions," 4 pgs, [online] [Retrieved on Jul. 29, 2004] Retrieved from the internet <Url:http://pages.ebay.com/help/basics/faq.html as available via the internet and printed on Jul. 29, 2004>.

Ebay.com, "How to Bid," 2 pgs, [online] [Retrieved on Jul. 29, 2004] Retrieved from the internet <URL:http://pages.ebay.com/help/welcome/bid.html>.

Ebay.com, "How to Sell," 2 pgs, [online] [Retrieved on Jul. 29, 2004] Retrieved from the internet <URL:http://pages.ebay.com/help/welcome/sell.html.

Ebay.com, "Star," 2 pgs, [online] [Retrieved on Jul. 1, 2008] Retrieved from the internet <URL:http://pages.ebay.com/help/basics/g-stars.html>.

Ebay.com, "What is eBay?" 2 pgs, [online] [Retrieved on Jul. 29, 2004] Retrieved from the internet <URL:http://pages.ebay.com/help/welcome/questions/about-ebay.html>.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

European Examination Report for European Patent Application EP 05722454.5, Feb. 8, 2007, 5 pgs.

Felicite.com, Wedding Registry & Gift Registry, Internet Archive Wayback Machine archived on May 30, 2003, 17 pgs, [online] [Retrieved on Feb. 2, 2007] Retrieved from the internet <URL:http://web.archive.org/web/20030530051929lhttp://www.felicite.conn>.

Glance, N., et al., "Knowledge Pump: Supporting the Flow and Use of Knowledge," Information Technology for Knowledge Management, 1998, 22 pgs.

Google, Inc., "Google Answers," Google, 2004, 1 page, [online] [retrieved on Jul. 29, 2004] retrieved from the internet <URL:http://answers.google.com/answers/>.

Google, Inc., "Google Answers: Frequently Asked Questions," Google, 2003, 9 pgs, [online] [retrieved on Jul. 29, 2004] retrieved from the Internet <URL:http://answers.google.com/answers/faq.html>.

Gross et al., "Information Revelation and Privacy in Online Social Networks," WPES '05, Alexandria, Virginia, Nov. 7, 2005, pp. 71-80.

(56) References Cited

OTHER PUBLICATIONS

Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs, 2005.
International Search Report and Written Opinion, International Application No. PCT/US2005/001544, Apr. 29, 2005, 9 pgs.
International Search Report and Written Opinion, International Application No. PCT/US2005/002240, Sep. 26, 2006, 5 pgs.
International Search Report, International Application No. PCT/US2008/005118, Sep. 30, 2008, 2 pgs.
Iyer, S., "Accounts Website," 7 pgs, [online] [Retrieved on Jul. 29, 2004] Retrieved from the internet <URL:http://www.cs.rice.edu/~ssiyer/accounts/>.
Jensen, C., et al., "Finding Others Online: Reputation Systems for Social Online Spaces," Group Spaces, CHI 2002, Apr. 20-25, 2002, pp. 447-454, vol. 4, Iss. 1.
Kamvar, S., et al., "The EigenTrust Algorithm for Reputation Management in P2P Networks." International World Wide Web Conference Proceedings of the 12th Proceedings of the 12th ICWWW 2003, pp. 640-651.
Kautz, H., et al., "ReferralWeb: Combining Social Networks and Collaborative Filtering," Communications of the ACM, Mar. 1997, 4 pgs, vol. 40, No. 3.
Konstan, J., et al., "Applying Collaborative Filinger to Usenet News," Communications of the ACM, Mar. 1997, pp. 77-87, vol. 40, No. 3.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Lockheed-Martin Corporation "Battlefield awareness and data dissemination intelligent information dissemination server," AFRL-IF-RS-TR-1999-238, Final Technical Report, Nov. 1999, 31 pgs.
Lueg, C., "Considering Collaborative Filtering as Groupware: Experiences and Lessons Learned," Proceedings of the Second International Conference of Practical Aspects of Knowledge Management, 1998, pp. 16-1-16-6.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Menna, "Phone Valet: Integrate your Phone with Mac OS X, O'Grady's PowerPage," http://www.powerpage.org/cgi-bin/WebObjects/powerpage.woa/wa/story?newsID~ 11803, Feb. 17, 2004 [Retrieved on Jul. 28, 2004].
Metcalf et al., "Spatial Dynamics of Social Network Evolution," 23rd International Conference of the System Dynamics Society, Jul. 19, 2005, pp. 1-13.
Microsoft Corporation, "Is Friendster the 'Next Big Thing'?" web page at http://mobilemomentum.msn.comlarticle.aspx?aid=4, as available via the Internet and printed Jul. 29, 2004.
Mori et al., "Real-world Oriented Information Sharing Using Social Networks," Group '05, Sanibel Island, Florida, USA, Nov. 6-9, 2005, pp. 81-84.
"Mufin.com: content-based recommendations," Net, Blogs and Rock'n'Roll, Oct. 8, 2008, [online] [Retrieved on May 13, 2009] Retrieved from the internet <URL: http://www.netblogsrocknrool.com/2008/10/mufin-music-fin.html>.
Multiply, "About Multiply," web page at http://multiply.com/info/about, as available via the Internet and printed May 3, 2004.
Multiply, "Help," web page at http://multiply.comlinfo/help, as available via the Internet and printed May 3, 2004.
Multiply, "Multiply Privacy Policy," web page at http://multiply.com/info/privacy, as available via the Internet and printed on May 3, 2004.
Multiply, "Multiply Terms of Service," web page at http://multiply.com/info/tos, as available via the Internet and printed on printed May 3, 2004.
Murchu et al., "Online Social and Business Networking Communities," Digital Enterprise Research Institute DERI Technical Report, National University of Ireland, Aug. 11, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
NomadNet, "Nomad Net News," web page at http://www.netnomad.com/, as available via the Internet and printed Dec. 1, 2004.
Ofoto, "Ofoto Share Albums," web page at htt~:/lwww.ofoto.com/ShareOverview.isg?UV=363085663086 78428514107, as available via the Internet and printed Dec. 1, 2004.
Online Business Network, "Social Networking Site Guide-Ryze, "web page at http://www.onlinebusinessnetworks.com/online-social-networks-guide/ryzEtQbp, as available via the Internet and printed Dec. 1, 2004.
PC World, "PCWorld-ICQ Builds a Social Network," web page at http://www.gcworld.com/news/article/O,aid,115084,OO.asg, as available via the Internet and printed Dec. 1, 2004.
PictureDot, "CactusVision WebCam from PictureDot.com-Broadcast your live webcam now, Free!" web page at http://www.picturedot.com/CactusVision WebCam Info.asp, as available via the Internet and printed Dec. 1, 2004.
"PlanetAll," From Internet Archive Wayback Machine on Nov. 1997, 19 pgs, [online] [Retrieved on Mar. 17, 2004] Retrieved from the internet <URL: Internet Archive Wayback Machine: www.archive.org/www/planetall.com>.
"Recommender system," Wikipedia, Last modified Jul. 27, 2009, [online] [Retrieved on Aug. 6, 2009] Retrieved from the internet <URL:http://en.wikipedia.org/wiki/Recommendation_system>.
Resnick, P., et al., "Recommender Systems," Communications of the ACM, Mar. 1997, pp. 56-58, vol. 40, No. 3.
Ring Central, Inc., Internet, retrieved at http://www.ringcentral.com, Apr. 19, 2007, 1 pg.
Rucker, J., et al., "Personalized Navigation for the Web," Communications of the ACM, Mar. 1997, pp. 73-75, vol. 40, No. 3.
SAE International, "Why should I register to use the SAE website?" web page at http://my.sae.org/whyregister.htm, as available via the Internet and printed Dec. 1, 2004.
Singh et al., "Cinema: Columbia InterNet Extensible Multimedia Architecture," Department of Computer Science, Columbia University, pp. 1-83, Apr. 26, 2002.
Steen et al., "Development of we-centric, context-aware, adaptive mobile services requires empathy and dialogue," Freeband FRUX, Oct. 17, 2005, Internet Journal, Netherlands, pp. 1-4.
Sullivan, Danny, "Is It Really Personalized Search?" http://searchengine watch.com, printed May 13, 2004.
Superfeedr Track, Internet, retrieved at http://blog.superfeedr.com/track/filter/xmpp/pubsubhubbub/track, May 13, 2011, 8 pgs.
Target, "Targetcom Wish List," 2 pgs, [online] [Retrieved on Aug. 4, 2004] Retrieved from the internet <URL: http://www.target.com/gp/registry.html/ref=nav_t_gc/601-191775906873 29?%5Fen-coding=UTF8&type=wishlist>.
Theme your Desktop, "Free Webcam Thumbnails on your Desktop—ANY webcam.com," web page at http://themes.anywebcam.com/desktop/desktop.html, as available via the Internet and printed Dec. 1, 2004.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
"Using AIM on Windows", http://www.aim.comlhelp_faq!usinglwin/away.adp?aolp~, Jul. 30, 2004.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

(56) References Cited

OTHER PUBLICATIONS

Westlaw, "WestClip", 2004, web page at <URL:http://west.thomson.com/westlaw/westclip>, as available via the Internet and printed Jul. 28, 2004, 3 pgs.

Yahoo!, "Yahoo! Chat," web page at http://chat.yahoo.com/, as available via the Internet and printed Dec. 1, 2004.

Yahoo! Groups, "Customize LostDrive-In," web page at http://groups.yahoo.com/group/lostdrivein/conwiz, as available via the Internet and printed Jun. 2, 2004.

Yahoo! Inc., "Yahoo! Groups," Yahoo! Inc., 2004, 2 pgs, [online] [retrieved on Jul. 29, 2004] retrieved from the internet <URL:http://groups.yahoo.com>.

Yahoo! Inc., "Yahoo! Help—Groups," Yahoo! Inc., 2004, 12 pgs, [online] [retrieved on Jul. 29, 2004] retrieved from the Internet <URL:http://help.yahoo.com/help/us/groups/groups-01.html>.

Yahoo!, "Yahoo! Help—Yahoo! GeoCities Tour," web page at http://help.yahoo.com/help/us/geo/tour/tour-O1.html, as available via the Internet and printed Dec. 1, 2004.

Yahoo! Inc., "Yahoo! Help—Groups Database," Yahoo! Inc., 2004, 9 pgs, [online] [retrieved on Jul. 29, 2004] retrieved from the Internet <URL:http://help.yahoo.com/help/us/groups/database>.

Yahoo!, "Introducing RSS Headlines," web page at http://e.my.yahoo.com/config/promo_content?.module=content, as available via the Internet and printed Jun. 18, 2004.

* cited by examiner

SYSTEMS AND METHODS FOR INDICATING A USER STATE IN A SOCIAL NETWORK

RELATED APPLICATIONS

This application is the continuation of and claims priority to U.S. application Ser. No. 10/861,031, filed Jun. 4, 2004, which is hereby incorporated by reference in its entirety.

FIELD OF THE INVENTION

The invention generally relates to social networks. More particularly, the invention relates to systems and methods for indicating a user state in a social network.

BACKGROUND

Conventional messaging applications or social networks allow users to send messages to each other and such conventional applications and networks can indicate whether a member is logged on to the network or messaging application. The abilities of existing social networks and messaging applications are limited however. Members typically cannot, for example, use conventional messaging applications or social networks to keep detailed, up-to-date information regarding user states to facilitate communication with other members.

SUMMARY

Embodiments of the present invention comprise systems and methods for indicating a user state for a member of a social network. According to one embodiment, a method comprises comprising receiving in a network of associated users user state information for a first user, wherein the network of associated users comprises user established relationships between users, determining a current user state for the first user; and outputting to a second user the user state information based at least in part on the current user state and a relationship based permission status.

This exemplary embodiment is mentioned not to limit or define the invention, but to provide one example of one embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

The present invention comprises methods and systems for determining a user state for a member of a social network. There are multiple embodiments of the present invention. By way of introduction and example, one exemplary embodiment of the present invention, provides a method for determining availability status and contact information for a user of a social network. For example, one embodiment allows a member to define user states that describe, for example, one or a combination of activity status, contact information, location, and other relevant information about the member. Other members desiring to contact or know the status of the member can then receive, for example, the user state information. Receiving the user state information can be limited to certain levels of types or associations or other permission restrictions set by the member.

A social network can refer to a computer network connecting people or organizations by a set of social relationships, such as friendship, co-working, or information exchange. Examples of social networks include services such as Orkut.com, Friendster.com, and tribe.net, for example.

System Architecture

Figure 1:
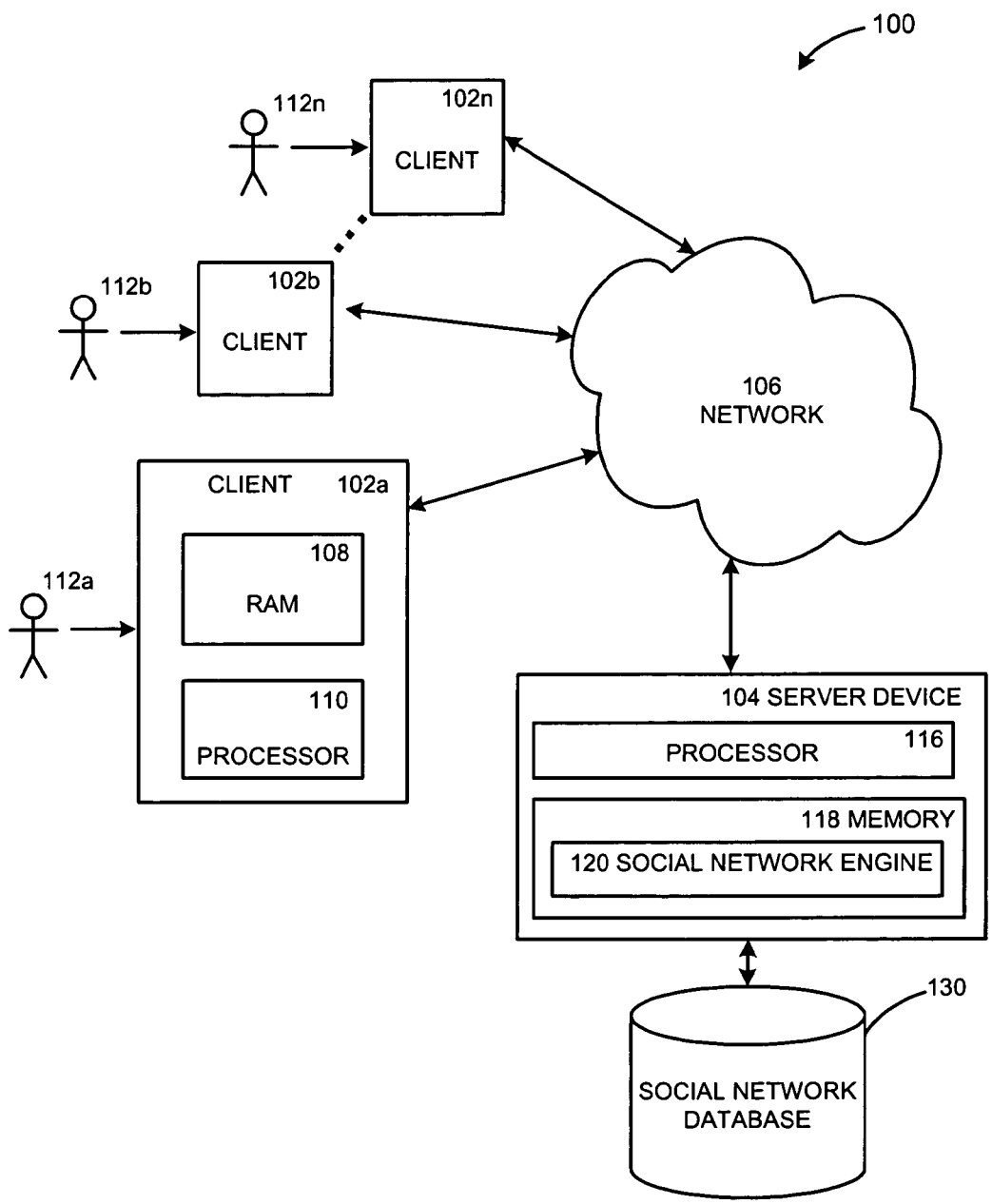
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. The server device 104 shown comprises a server executing a social network engine application program. Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 allows users, such as user 112a, to interact with and participate in a social network. A social network can refer to a computer network connecting people or organizations by a set of social relationships, such as friendship, co-working, or information exchange. A social network can comprise profiles that can be associated with other profiles. Each profile may represent a member, and a member can be an entity such as, for example, a person, an organization, a business, a corporation, a community, a fictitious person, or other entity. Each profile can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

Additionally, entries within a profile can comprise associations with other profiles. Associations between profiles within a social network can include, for example, friendships, business relationships, acquaintances, community associations, activity partner associations, common interest associations, common characteristic associations, or any other suitable type of social relationship connection. Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profile A and C. A degree of separation can be type specific or type neutral. Type specific degrees of separation only count relationships of a certain type. Thus, for example, in the case above where A is a friend of B, and B is a friend of C, there is a friendship degree of separation of two, even if A is directly associated with C by a business association, which would otherwise produce a degree of separation of 1.

Moreover, profiles can comprise user states. User states can comprise user state information, including, for example, an activity status, location status, availability status, contact information, or other user state information for a member of the social network. Activity status can include, for example, a type of activity or activities the member is engaged in or interested in. For example, an activity status "working" can indicate that the member is working. Additionally, an activity status "recreation" can indicate the member is involved in recreation or is looking for recreational activity. Location status can include, for example, information relating to where the member is located. For example, an "office" location status can indicate that the member is at an office location. Likewise, a "home" location status can indicate that the member is at home. An availability status can include, for example, information relating to whether the member can or wants to be contacted. For example, an "unavailable" availability status can indicate that member does not want to be contacted. The availability status can be specific for different types or levels or degrees of association. Thus, an activity status can indicate that the member is available to best friends, or to friends of best friends, but not to anyone else. Different types of user state information can be combined into one state. For example, the working activity status and "office" location status above can be combined into a "work" user state. The "work" user state can further include the availability of the member and other suitable user state information. Contact information for the member can comprise, for example, an email address and telephone number, an instant messaging user name, or other suitable contact information. Thus, for example, a work user state for a first member of the social network can be associated with a work telephone number and a work email address for the first member. A second member of the social network, who desires to contact the first member, can retrieve output identifying the first member's user state and, based on the first member's user state, a preferred contact method can be determined by the social network engine 120 and output to the second member. These types of user state information are listed as examples and are not exhaustive. Other types of user state information can be used within the scope of various embodiments of the method 300 described below.

The social network engine 120 can further determine a current user state associated with a member's profile. The current user state can comprise, for example, a user state that is associated with a current activity or location of a member of the social network. For example, when a member of the social network is at home, the member's current user state can be a "home" user state. The social network engine 120 can update the current user state based, for example, on a schedule entered by a member, a manual indication from the member, an IP address, information from a client device, or other suitable signals. The social network engine 120 can then use the current user state to facilitate communication between the member and other members of the social network. For example, three user states can exist for a first member of the social network. The first user state can be a work user state associated with a work email address. The second user state can be a commuting user state associated with a mobile phone number, and the third user state can be a home user state associated with an instant messaging user name. The member of the social network can then enter a schedule indicating, for example, that the member's current user state should reflect a work user state from 8:00 a.m. until 5:00 p.m., a commuting user state from 5:00 p.m. until 6:00 p.m., and a home user state from 6:00 p.m. until 7:00 a.m. A second member attempting to contact the first member can then be notified of the current user's state of the first member and receive the preferred contact method associated with that current user state. For example, the second member of the social network can attempt to contact the first member of the social network at 5:30 p.m. The second member can be notified that the first member's user state is a commuting user state and can be notified that the preferred contact method is a mobile phone number. The second member can then receive from the social network engine the mobile phone number of the first network member.

Server device 104 also provides access to storage elements, such as a social network storage element, in the example shown in FIG. 1, a social network database 130. The social network database 130 can be used to store profiles and to store communities created by the community processor 124. Data storage elements may include any one or combination of methods for storing data, including without limitation, arrays, hash tables, lists, and pairs. Other similar types of data storage devices can be accessed by the server device 104. The social network engine 120 can receive data comprising the profiles and communities from the social network database 130 and can also send data comprising communities and profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the methods illustrated in FIGS. 2-3.

Exemplary Social Network

Figure 2:
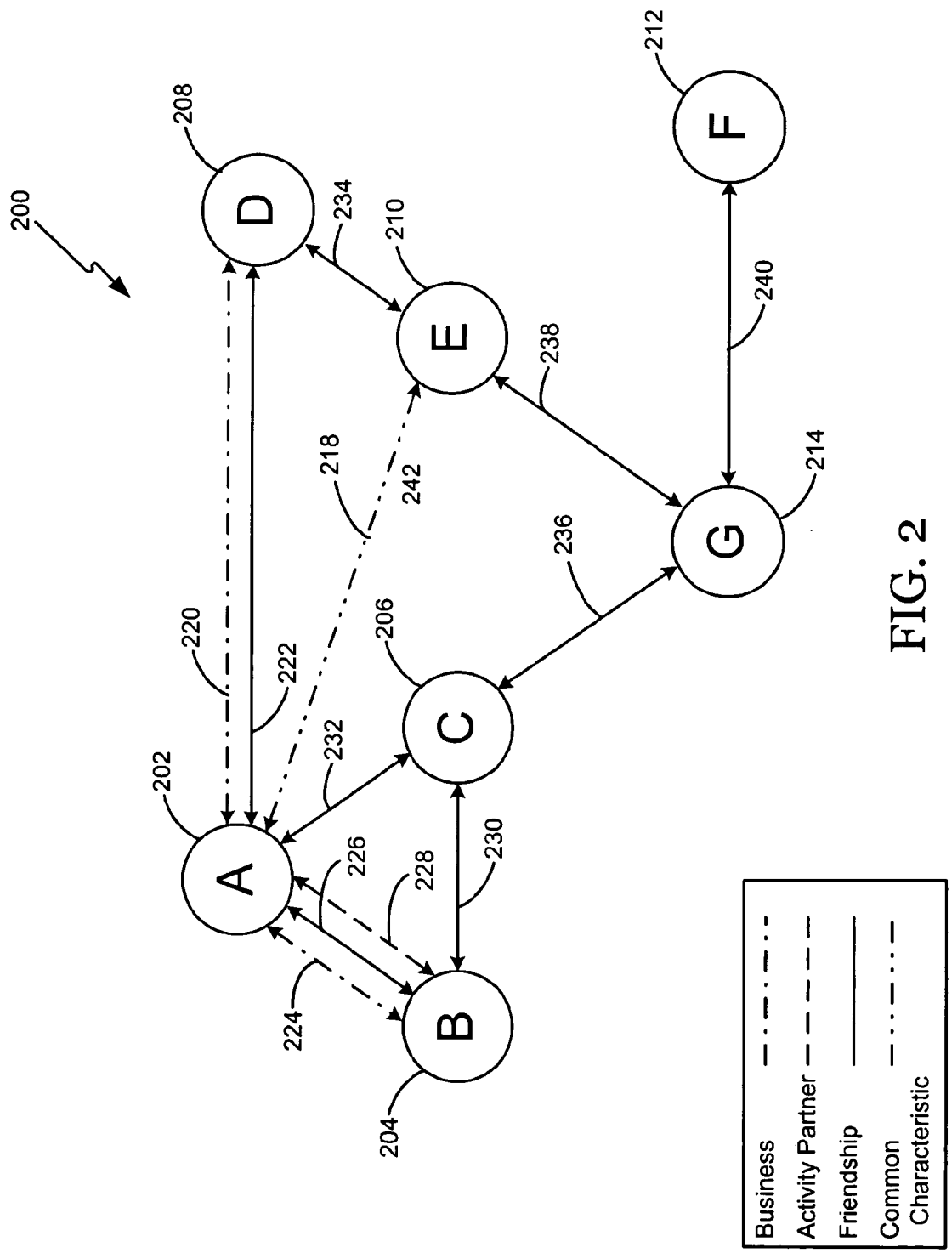
FIG. 2 illustrates a diagram of an exemplary social network in accordance with one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. According to another embodiment, one or more of the vertices can represent a community. The methods and systems discussed below are equally applicable to an embodiment where the vertices comprise one or more communities, but for purposes of illustration, the vertices depicted in FIG. 2 represent member profiles. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. According to one embodiment, relationships can be established by an invitation and an acceptance of the invitation. For example, a first user can send an invitation to a second user inviting the second user to form a relationship with the first user. The second user can accept or reject the invitation. According to one embodiment, if the second user rejects the invitation, a one-way relationship can be formed between the first user and the second user. According to another embodiment, if the second user rejects the relationship, no relationship may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, can be referred to as user established relationships.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, 234, 236, 238 and 240 shown comprise associations between profiles. According to the embodiment shown in FIG. 2, the social network 200 comprises a plurality of differing types of associations represented by edges 218, 220, 222, 224, 226, 228, 230, 232, 234, 236, 238 and 240. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, 234, 236, 238, and 240 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends can include profile B, but a display of profile B's friends would not include profile A.

According to another embodiment, a directed or single direction association can be formed when one member indicates a relationship with a second member but the second member does not reciprocate the relationship. For example, a member associated with profile A can indicate that he is a friend of a member associated with profile B. The member associated with profile B in this example can decide not to indicate that the member associated with profile A is a friend. According to one embodiment, profile B would not be displayed with profile A's friends nor would profile A be displayed with profile B's friends as the relationship was not reciprocated by profile B. Similarly, profile B may not be included, for example, within a listing of friends of profile A for purposes of determining degrees of separation, for example. Thus, in such an embodiment, the displaying of profile B can be controlled by the relationships the member associated with profile B assents to.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Processes

Various methods in accordance with the present invention may be carried out. For example, in one embodiment, a method comprises receiving in a network of associated users a user state associated with a member of the network of associated users, the user state comprising user state information entered by the member; determining a current user state for the member; and outputting the user state information based at least in part on the current user state. According to one embodiment, receiving the user state can comprise receiving one or more of activity information, location information, availability status, contact information, or custom information. According to another embodiment, receiving a user state can comprise outputting a user interface, such as a graphical user interface for example, or a template. According to another embodiment, determining a current user state can comprise one or more of determining a schedule, receiving a manual indication, identifying an IP address, determining a geographical location, receiving a GPS signal, mobile phone triangulation, or receiving information from a client device. According to another embodiment, identifying the IP address can comprise associating an IP address with a geographical location. According to another embodiment, receiving information from a client device can comprise receiving a cookie.

According to another embodiment, outputting user state information can comprise outputting one or more of contact information, location information, availability status information, activity status information, or custom information. According to another embodiment, outputting user state information can be in response to an implicit or explicit query or as part of a social network interface. According to another embodiment, the user state information can be output together with a picture associated with a profile. According to another embodiment, outputting user state information can comprise determining a degree of separation, a relationship type, or a relationship level. According to another embodiment, outputting user state information can comprise outputting user state information using one or more of email, instant messaging, telephone, or mailing address. According to another embodiment, outputting the use state can comprise initiating a telephone call.

Figure 3:
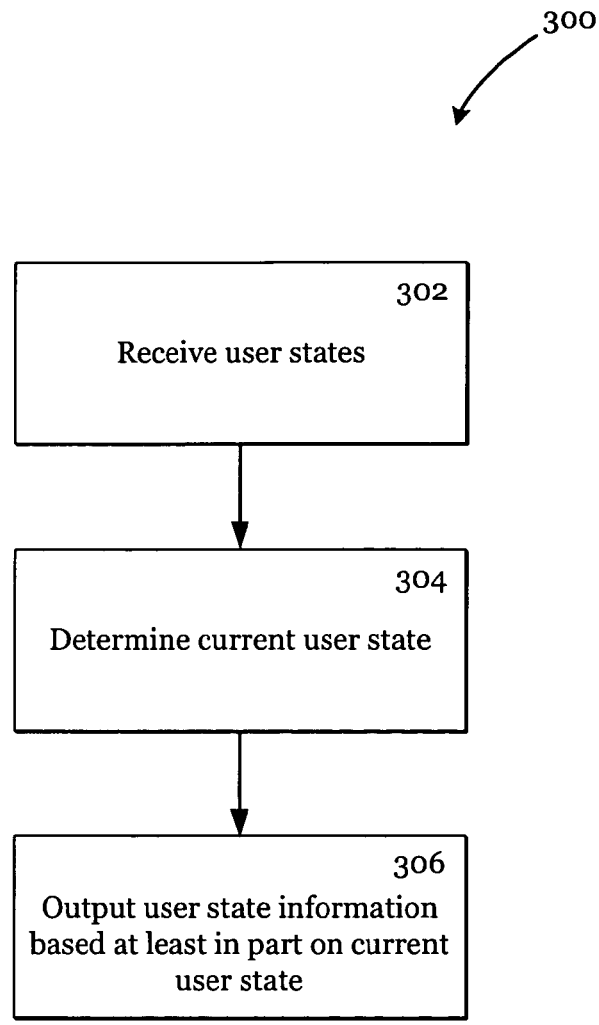
FIG. 3 illustrates a method in accordance with one embodiment of the present invention.

FIG. 3 illustrates an exemplary method 300 in accordance with one embodiment of the present invention. This exemplary method is provided by way of example, as it will be appreciated from the foregoing description of exemplary embodiments there are a variety of ways to carry out methods in other embodiments of the present invention. The method 300 shown in FIG. 3 can be executed or otherwise performed by any of various systems. The method 300 is described below as carried out by the system 100 shown in FIG. 1 by way of example, and various elements of the system 100 are referenced in explaining the example method of FIG. 3.

The method 300 shown provides a method for determining a user state for a member of a social network. The method 300 begins in block 302 wherein the social network search engine receives a user state from the user 112a. Receiving a user state can comprise, for example, receiving input from the user 112a defining content for a user state. The social network engine 120 can receive input, for example, by presenting an interface to the user 112a, or by monitoring input from the user 112a. For example, according to one embodiment, the social network engine 120 can cause the output of a user interface that allows the user 112a to define user states. The user interface can prompt for such information as a name of a user state, such as "work" or "home;" location information for the user state, such as an office address or a home address; availability information such as "available to friends" or "not available;" contact information, such as a phone number or email address; or any other suitable information defining a user state. Thus, the user 112a can use the user interface to enter a work address, a work telephone number, a work schedule, and a preferred contact method, including, for example, a work email address to define a work user state.

User states may also be created based on templates. Templates can include, for example, common user states with suggested types of user state information. For example, the social network engine 120 can present a user with a template for a home user state that prompts the user for a home address, home availability status, and home contact information. Thus, for example, the social network engine can prompt for a variety of common user states and thus allow the creation of multiple user states for the user 112a without a lot of cognitive effort on the part of the user 112a. The social network engine can have default prompts, for example, for a home, work, and recreation user state.

Alternatively, users can create their own custom user states. Custom user states can comprise, for example, a user state defined for a unique activity or state of a member of the social network. Custom user states can comprise any type of information defined by the user 112a and can thus be tailored to specific interests of the user 112a. For example, the user 112a can have an interest in water skiing and, for example, create a water skiing user state that indicates which lake the user 112a is on, whether the user 112a would like additional members to join him, whether the member is wake boarding or slalom skiing, and a time to meet on the lake. Members can use the user states, for example, to facilitate communication or activities with other members of the social network. Thus, in the previous example, the user 112a can use the water skiing user state to let his friends know he is water skiing and invite those who are interested to join him.

Once user states are received by the social network engine 120, the method 300 proceeds to block 304, wherein the social network engine 120 determines a current user state. Determining a current user state can comprise, for example, determining a schedule for a member of the social network, receiving a manual indication from the member, determining a geographical location for a member, receiving an IP address associated with the member, receiving information from a client device associated with the member, or other suitable indications of the member's activity, location or status. Receiving a manual indication can comprise, for example, presenting to the member a user interface or other suitable interface displaying multiple possible use states and monitoring a selection made by the member, for example, by clicking on a desired current user state. For example, the social network engine 120 can cause the member to be presented with an icon representing a home use state, a work user state, and a commuting user state. The member can then use an input device, such as a mouse for example, to select the icon corresponding to the member's current user state. Thus, for example, when the member arrives at work he can select the work user state, when he leaves work he can select the commuting user state, and when he arrives home he can select the home user state. Determining a geographical location associated with a user can comprise, for example determining a position based on triangulation of a signal from a mobile phone or other similar device, from receiving a signal from a Global Positioning System (GPS) device, or receiving an IP address for a member. Determining a position based on triangulation of signals can comprise determining a distance from a source signal to each of three or more locations based on the speed of the signal and the elapsed time from when the signal was sent to when the signal is received. Determining a position based on a signal from a GPS device can comprise receiving, for example, a longitude and a latitude coordinate determined from signals received from multiple satellites by a GPS capable unit. The geographical location determined by triangulation or GPS signals can then be compared by the social network engine 120 to a location associated with a user state.

Receiving an IP address from a member can comprise, for example, receiving a request signal associated with the member, identifying an IP address for the request signal and, determining a geographical location associated with the IP address. For example, the social network engine 120 can receive a login request from the member while the member is at work, for example. The search engine can identify the member based, for example, on login information entered by the member and can identify the IP address of the incoming login request. The social network engine 120 can then determine a geographical location associated with the IP address, for example, by looking up the IP address in a table listing IP addresses and corresponding geographical locations. The social network engine 120 can match the geographical location with, for example, a work address within the member's work user state. Based on the geographical location association with the IP address and the work address, the social network engine 120 can determine a work user state as the current user state of the user 112*a*. The user 112*a* can then go home and log in again to the social network. The user's 112*a* IP address can now reflect a different geographical location, which the social network engine 120 can match with a home address contained in a home user state associated with the member. The social network engine 120 can update the current user state of the user 112*a* to a home user state based on the match between the geographical location associated with the IP address and the home address.

Receiving information from a client device associated with the member can comprise, for example, receiving a packet, such as a cookie for example, and identifying a client device and an associated member of the social network based on the packet. For example, the social network engine 120 can receive a packet of information from a web browser application on a work computer for the member of the social network. The packet of information can identify the work computer and can identify the name of the member of the social network. The social network engine can then determine a user state associated with the client device, for example, a work user state. The social network engine can determine a user state associated with the client device based, for example, on an explicit association made by the member, or a history of user states associated with the client device. For example, the member can explicitly identify a work use state corresponding to the work client device, for example. Alternatively, the social network engine 120 can identify a previous user state entered by the member on a particular client and associate future activity on the particular client with the previous user state. For example, the member can logon to the social network from the work client device and indicate a work user state. On subsequent logons, the social network engine 120 can receive a cookie from a web browser application and can recall the work user state, even if the member does not actively indicate a user state explicitly.

Receiving information from a client device associated with the member can further comprise detecting activity on a client device. For example, the social network engine 120 can receive a signal indicating when the user 112*a* moves a mouse, opens an application, or conducts other activity on the client device 102*a*. Additionally, the social network engine can detect when the client device 102*a* enters a suspend mode or is shut down for example. This information can be used by the social network engine 120 to determine whether a member is currently online for example, or whether a member is currently available or unavailable at a location associated with the client device Once the social network engine 120 determines a current user state, the method 300 proceeds to block 306, wherein the social network engine 120 outputs user state information based at least in part on the current user state. Outputting user state information based at least in part on the current user state can comprise outputting contact information, location status information, availability information, activity status information, or custom information comprising the current user state of a member of the social network. The contact information can include, for example, an email address, a telephone number, an instant messaging user name, a mailing address, or any other suitable contact information comprising the current user state of the member of the social network. Location status information can comprise, for example, a specific address or a general area identifying a location associated with the current user state of the member. For example, the user can indicate a specific work address for a work user state, or could identify a general area, such as a hometown for a recreational user state. The social network engine 120 can then return either the specific address or the general location information based on the current user state of the member. Availability information can include, for example, whether a member is available for contact as defined by the current user state. Thus, for example, a member of the social network can indicate an unavailable status for a home user state and an available status for a work user state, and the social network engine 120 can output the availability information based on the current user state of the member of the social network. Activity status information can comprise, for example, a specific type of activity or general category of activity associated with the user state. For example, a user state can indicate a general category of activity, such as working, or can comprise a specific activity status, such as water skiing on Lake Powell. Custom information can include any additional entries within a user state. For example, custom information can include what a member is wearing, how much a member enjoys the activity associated with the current user state, what kind of music the member is listening to, what sort of mood the member is in, whether the member desires activity partners, or any other suitable information associated with a customized user state for a member of the social network.

Outputting user state information can occur in response to a query entered by the user 112a. For example, the user 112a can log on to a social network and explicitly request the user state of a member of the social network, for example, by typing the name of the member into a search field. Or, alternatively, a query can be based on an implicit query generated by an application of the client device 102a. Thus, for example, if the user 112a is typing an email on the client device 102a, an application on the client device 102a can capture a name contained within the email and send the name to the social network engine 120, which can return user state information for a member associated with the name. Additionally, user state information can be output as part of the social network interface presented by the social network engine 120 to the user 112a. For example, the user 112a can log on to the social network and be presented with a user interface identifying profile information associated with friends of the user 112a. The profile information for the friends of the user 112a can comprise, for example, a picture, a name, and a user state.

The output of user state information of the social network 120 can be based on a relationship based permission status. A relationship based permission status can comprise restrictions on outputting user state information based on relationship type, relationship level, degree of separation, or other suitable qualifying characteristics. For example, a member of the social network can indicate that only friends, or friends of friends, have permission to view the member's user state. The social network 120 can then selectively output user state information for the member only to qualifying friends or friends of friends. Qualifications based on relationship status can include, for example, a type of relationship, such as a haven't met level, an acquaintance level, a friend level, a good friend level, or a best friend level. A member of the social network can indicate that only good friends and best friends are permitted to view the member's user state information.

Qualifications based on relationship type can include, for example, permission based on whether an association is a friendship association, a business relationship association, an acquaintance association, a community association, an activity partner association or any other type of association. For example, the social network engine 120 can allow a user to indicate that only business relationship associations are permitted to view the member's work user state. Additionally, the social network engine 120 can allow the member to restrict access to the member's home user state information or recreational user state information to friendship associations or activity partner associations. A degree of separation qualification can comprise, for example, a permission status based on the number of associations separating a member of the social network from another member of the social network. For example, a member of the social network can indicate that only members separated by fewer than two degrees of separation can be permitted to view user state information for the member. For example, the social network 120 can enable the user 112a to indicate that only friends and friends of friends can view the user state information for the member and exclude friends of friends of friends.

The social network engine 120 can output user state information by displaying or presenting the user state information within a social network interface, by sending an email message, by sending an instant messaging message, by placing a telephone call, or by another suitable method of communication. For example, the social network engine 120 can output user state information together with a picture of a profile on a social network interface. Or, for example, the social network 120 can send an email message to a member of the social network who has requested the user state information for another member. The social network engine 120 can also use instant messaging dialogue to communicate the user state information for members of the social network. For example, if a first member of the social network is chatting with a second member of the social network using an instant messaging application, the social network 120 can monitor a conversation between the first member in the social network and the second member of the social network, and also monitor the current user state of the first member and the second member. The search engine 120 can further notify, for example, the first member when the current user state of the second member changes. Thus, for example, if the second member logs on from a different client device, the social network engine 120 can update the current user state of the second member and notify the first member via the instant messaging application that the user state of the current user state of the second member has changed, and can supply the first member with a new preferred contact method, for example, for contacting the second member of the social network.

Moreover, the social network engine 120 can receive a request from a first member of the social network to contact a second member of the social network and can identify, for example, that the preferred contact method for the second member of the social network is a telephone number. The social network engine 120 can present the telephone number to the first member of the social network or, alternatively, can proceed to initiate a telephone call between the first member of the social and the second member of the social network based on the telephone number of the preferred contact method for the second member and a telephone number associated with the current user state of the first member. Thus, for example, if the first member of the social network is at home and has indicated a home telephone number associated with a home user state, and the second member is at work and has indicated a work telephone number associated with a work user state, the social network engine 120 can initiate a telephone call from the home telephone number of the first member to the work telephone number of the second member.

General

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A method comprising:
receiving, using one or more processors, in a social network, user state information for a first user, wherein the social network comprises user established relationships between users;
determining, using the one or more processors, a current user state for the first user as a first user state;
determining, using the one or more processors, displayable user state information of the first user including different availability statuses of the first user displayable for different users who connect with the first user in the social network by determining that the first user is available for a second user based on the current user state of the first user and a degree of separation between the first user and the second user, and determining that the first user is unavailable for a third user based on the current user state of the first user and a degree of separation between the first user and the third user, wherein the degree of separation between the first user and the second user is different from the degree of separation between the first user and the third user;
receiving, using the one or more processors, packets of information from a first client device and a second client device;
identifying, using the one or more processors, a history of user states for the first user based on the packets of information by identifying an association between the first user state and the first client device, and identifying an association between a second user state and the second client device;
determining, using the one or more processors, a change of the current user state of the first user from the first user state to the second user state by identifying the second client device from a packet of information associated with the first user, and identifying the second user state from the history of user states based on the association with the second client device;
updating, using the one or more processors, the displayable user state information of the first user responsive to the change of the current user state of the first user; and
providing for display to the second user and the third user, using the one or more processors, the displayable user state information of the first user.

2. The method of claim 1, wherein the user state information comprises one or more of activity information or location information.

3. The method of claim 1, wherein receiving the user state information further comprises receiving an input from a user interface.

4. The method of claim 1, wherein determining the current user state further comprises determining a schedule.

5. The method of claim 1, wherein determining the current user state further comprises receiving an indication from the first user.

6. The method of claim 1, wherein determining the current user state further comprises determining a geographical location.

7. The method of claim 6, wherein determining the geographical location is based on at least one of receiving a signal from a Global Positioning System device, triangulating signals from a mobile phone, or determining an internet protocol (IP) address.

8. The method of claim 1 further comprising:
determining a preferred mode of contact; and
wherein providing for display to the second user the displayable user state information is based at least in part on the preferred mode of contact.

9. A system comprising:
a processor; and
a social network engine stored on a memory and executable by the processor, the social network engine receiving in a social network user state information for a first user, wherein the social network comprises user established relationships between users, determining a current user state for the first user as a first user state, determining displayable user state information of the first user including different availability statuses of the first user displayable for different users who connect with the first user in the social network by determining that the first user is available for a second user based on the current user state of the first user and a degree of separation between the first user and the second user, and determining that the first user is unavailable for a third user based on the current user state of the first user and a degree of separation between the first user and the third user, wherein the degree of separation between the first user and the second user is different from the degree of separation between the first user and the third user, receiving packets of information from a first client device and a second client device, identifying a history of user states for the first user based on the packets of information by identifying an association between the first user state and the first client device, and identifying an association between a second user state and the second client device, determining a change of the current user state of the first user from the first user state to the second user state by identifying the second client device from a packet of information associated with the first user, and identifying the second user state from the history of user states based on the association with the second client device, updating the displayable user state information of the first user responsive to the change of the current user state of the first user, and providing for display to the second user and the third user the displayable user state information of the first user.

10. The system of claim 9, wherein the user state information comprises one or more of activity information or location information.

11. The system of claim 9, wherein receiving the user state information further comprises receiving an input from a user interface.

12. The system of claim 9, wherein determining the user state information further comprises determining a schedule.

13. The system of claim 9, wherein determining the current user state further comprises receiving an indication from the first user.

14. The system of claim 9, wherein determining the current user state further comprises determining a geographical location.

15. The system of claim 14 wherein determining the geographical location is based on at least one of receiving a signal from a Global Positioning System device, triangulating signals from a mobile phone, or determining an internet protocol (IP) address.

16. A computer program product comprising a non-transitory computer useable medium and a computer readable program stored on the non-transitory computer useable medium, wherein the computer readable program when executed on a computer causes the computer to:

receive in a social network user state information for a first user, wherein the social network comprises user established relationships between users;

determine a current user state for the first user as a first user state;

determine displayable user state information of the first user indicating different availability statuses of the first user displayable for different users who connect with the first user in the social network by determining that the first user is available for a second user based on the current user state of the first user and a degree of separation between the first and second user and determining that the first user is unavailable for a third user based on the current user state of the first user and a degree of separation between the first and third user, wherein the degree of separation between the first user and the second user is different from the degree of separation between the first user and third user;

receive packets of information from a first client device and a second client device;

identify a history of user states for the first user based on the packets of information by identifying an association between a second user state and the second client device;

determine a change of the current user state of the first user from the first user state to the second user state by identifying the second client device from a packet of information associated with the first user, and the identifying the second user state from the history of user states based on the association with the second client device;

update the displayable user state information of the first user responsive to the change of the current user state of the first user; and provide for display to the second user and the third user the displayable user state information of the first user.

17. The computer program product of claim 16, wherein determining the current user state further comprises determining a schedule.

18. The computer program product of claim 16, wherein determining the current user state further comprises receiving an indication from the first user.

19. The computer program product of claim 16, wherein determining the current user state further comprises determining a geographical location.

20. The computer program product of claim 19, wherein determining the geographical location is based on at least one of receiving a signal from a Global Positioning System device, triangulating signals from a mobile phone, or determining an internet protocol (IP) address.

* * * * *